(12) United States Patent
Zhu et al.

(10) Patent No.: US 10,876,722 B2
(45) Date of Patent: Dec. 29, 2020

(54) FINGERPRINT BUTTON UNIT, LIGHT-EMITTING PROMPTING DEVICE, AND ELECTRONIC APPARATUS

(71) Applicant: GUANGDONG OPPO MOBILE TELECOMMUNICATIONS CORP., LTD., Guangdong (CN)

(72) Inventors: Shiqiang Zhu, Guangdong (CN); Chendong Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 136 days.

(21) Appl. No.: 16/223,007

(22) Filed: Dec. 17, 2018

(65) Prior Publication Data
US 2019/0120472 A1 Apr. 25, 2019

Related U.S. Application Data

(63) Continuation of application No. PCT/CN2017/091876, filed on Jul. 5, 2017.

(30) Foreign Application Priority Data
Aug. 12, 2016 (CN) .................... 2016 2 0877540 U

(51) Int. Cl.
*F21V 23/04* (2006.01)
*F21V 33/00* (2006.01)
(Continued)

(52) U.S. Cl.
CPC ...... *F21V 23/0485* (2013.01); *F21V 23/0407* (2013.01); *F21V 33/00* (2013.01);
(Continued)

(58) Field of Classification Search
CPC .. F21V 33/00; F21V 23/0485; F21V 23/0407; G06K 9/00013; G06K 9/0004; G06K 9/209
See application file for complete search history.

(56) References Cited

U.S. PATENT DOCUMENTS 7,349,561 B2 * 3/2008 Hata .................... G06K 9/0004
                                                  382/124
8,520,912 B2 * 8/2013 Wu ..................... G06K 9/00046
                                                  382/115
(Continued)

FOREIGN PATENT DOCUMENTS

AU        2013100571 A4     5/2013
CN         202075693 U     12/2011
(Continued)

OTHER PUBLICATIONS

European search report, EP17838486, dated Nov. 7, 2019 (12 pages).
(Continued)

*Primary Examiner* — William N Harris
(74) *Attorney, Agent, or Firm* — Ladas & Parry, LLP

(57) ABSTRACT

A light-emitting prompting device is provided. The light-emitting prompting device includes a fingerprint button unit received in a receiving hole of a cover assembly of an electronic apparatus. The fingerprint button includes a fingerprint recognition device and a light-emitting portion. The fingerprint recognition device includes a fingerprint cover, a fingerprint chip, and a circuit board. The fingerprint cover defines a light-shielding region and a light-transmitting region. The light-emitting portion is located at one side of the circuit board that is away from the fingerprint chip; a projection of the light-emitting portion on the cover extends beyond a projection of the circuit board, and further extends into the light-transmitting region, such that the light-emit-
(Continued)

ting portion shields the light-transmitting region. A fingerprint button and an electronic apparatus are further provided.

20 Claims, 6 Drawing Sheets

(51) Int. Cl.
 *G06K 9/20* (2006.01)
 *G06K 9/00* (2006.01)
 *F21V 8/00* (2006.01)
 *F21Y 115/10* (2016.01)
 *H04M 1/02* (2006.01)
 *H04M 1/22* (2006.01)

(52) U.S. Cl.
 CPC ......... *G02B 6/0066* (2013.01); *G06K 9/0004* (2013.01); *G06K 9/00013* (2013.01); *G06K 9/209* (2013.01); *F21Y 2115/10* (2016.08); *G06K 9/00053* (2013.01); *G06K 9/00067* (2013.01); *G06K 9/00087* (2013.01); *H04M 1/0277* (2013.01); *H04M 1/22* (2013.01)

(56) References Cited

U.S. PATENT DOCUMENTS

| | | |
|---|---|---|
| 2004/0240713 A1 | 12/2004 | Hata |
| 2007/0153258 A1 | 7/2007 | Hernandez |
| 2014/0205160 A1 | 7/2014 | Chang et al. |
| 2016/0004899 A1* | 1/2016 | Pi .......................... G06K 9/0002 345/173 |
| 2016/0171271 A1* | 6/2016 | Lundahl ............. G06K 9/00053 382/124 |
| 2018/0053030 A1* | 2/2018 | Zhang ................ G06K 9/00087 |
| 2018/0053037 A1* | 2/2018 | Zhang .................. H05K 3/0058 |

FOREIGN PATENT DOCUMENTS

| | | |
|---|---|---|
| CN | 104598893 A | 5/2015 |
| CN | 104700080 A | 6/2015 |
| CN | 204791058 U | 11/2015 |
| CN | 205334501 U | 6/2016 |
| CN | 205405465 U | 7/2016 |
| CN | 206178863 U | 5/2017 |
| WO | WO2015077733 A1 | 5/2015 |

OTHER PUBLICATIONS

International Search Report for PCT/CN2017/091876 with English translation provided by WIPO, dated Oct. 13, 2017.
Written Opinion of the International Searching Authority, with machine English translation provided by Google, dated Oct. 13, 2017.

* cited by examiner

US 10,876,722 B2

FINGERPRINT BUTTON UNIT, LIGHT-EMITTING PROMPTING DEVICE, AND ELECTRONIC APPARATUS

CROSS REFERENCE TO RELATED APPLICATIONS

The present application is a continuation-application of International (PCT) Patent Application No. PCT/CN2017/091876 filed Jul. 5, 2017, which claims priority to Chinese Patent Application No. 201620877540.2, filed on Aug. 12, 2016, the entire contents of which are hereby incorporated by reference in their entireties.

TECHNICAL FIELD

The described embodiments relate to electronic apparatuses, and in particular to a fingerprint button unit, a light-emitting prompting device, and an electronic apparatus having the light-emitting prompting device.

BACKGROUND

At present, electronic apparatuses, such as mobile phones and computers, have been widely used as communication and information interaction devices. Users can make phone calls, send short messages, or connect with others through social software by using the electronic apparatuses, which bringing lots of convenience to the users in their daily lives. In order to prompt incoming calls, short messages or other events, the electronic apparatuses are usually equipped with prompting lights to perform visual promptings. For example, when there are unread short messages, the prompting lights will be illuminated to prompt the user.

However, the prompting lights in the related art are separately disposed on front screens of the electronic apparatuses, and the prompting lights occupy extra space. In this way, for an electronic apparatus having a smaller volume such as a mobile phone or the like, the screen ratio is further reduced.

BRIEF DESCRIPTION OF THE DRAWINGS

In order to make the technical solutions described in the embodiments of the present disclosure or the technical solution in the related art more clear, the drawings used for the description of the embodiments or the related art will be briefly described. Apparently, the drawings described below are only some of the embodiments of the present disclosure, and those skilled in the art may acquire other drawings based on these drawings, without making any creative efforts.

DETAILED DESCRIPTION

Technical solutions in the embodiments of the present disclosure will be clearly and completely described below with reference to the accompanying drawings in the embodiments of the present disclosure. Apparently, the embodiments described below are merely some of the embodiments of the present disclosure, rather than all of the embodiments. All other embodiments obtained by those skilled in the art without creative efforts on the basis of the embodiments of the present disclosure shall fall within the protection scope of the present disclosure.

Figure 1:
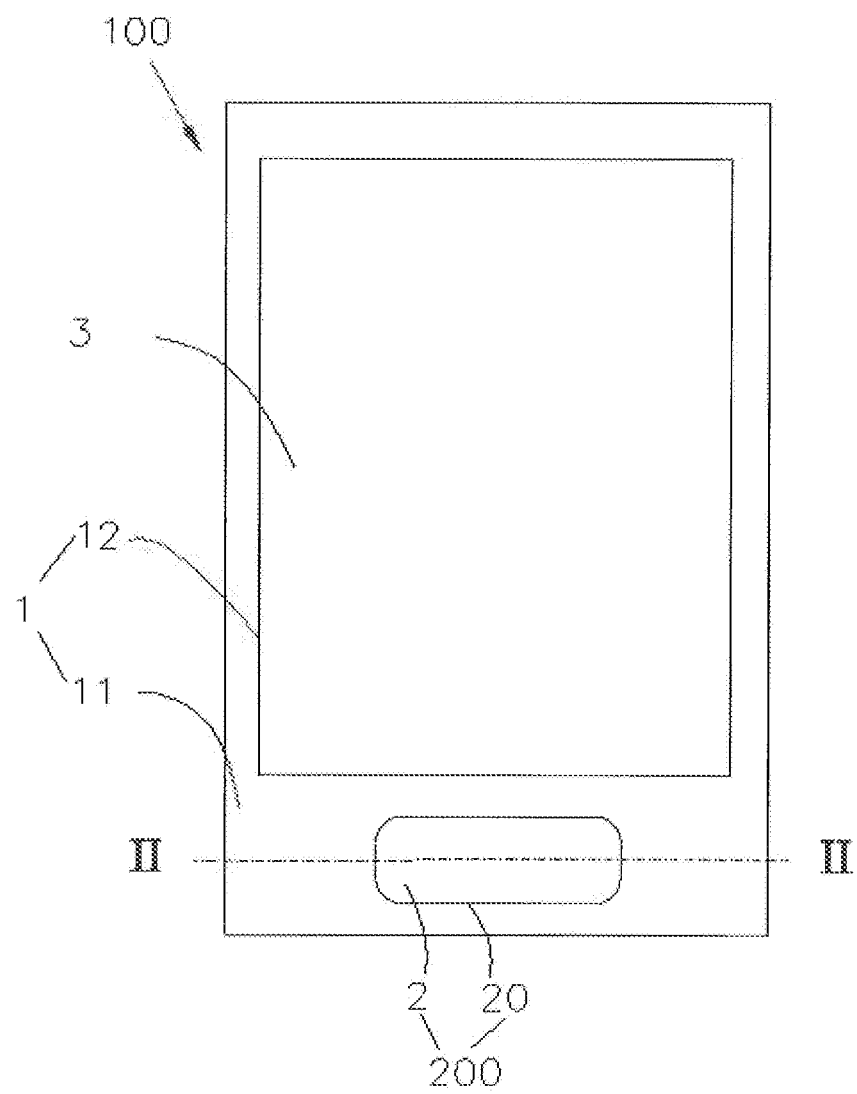
FIG. 1 is a perspective view of an electronic apparatus shown in a first viewing angle according to an embodiment of the present disclosure.
Figure 2:
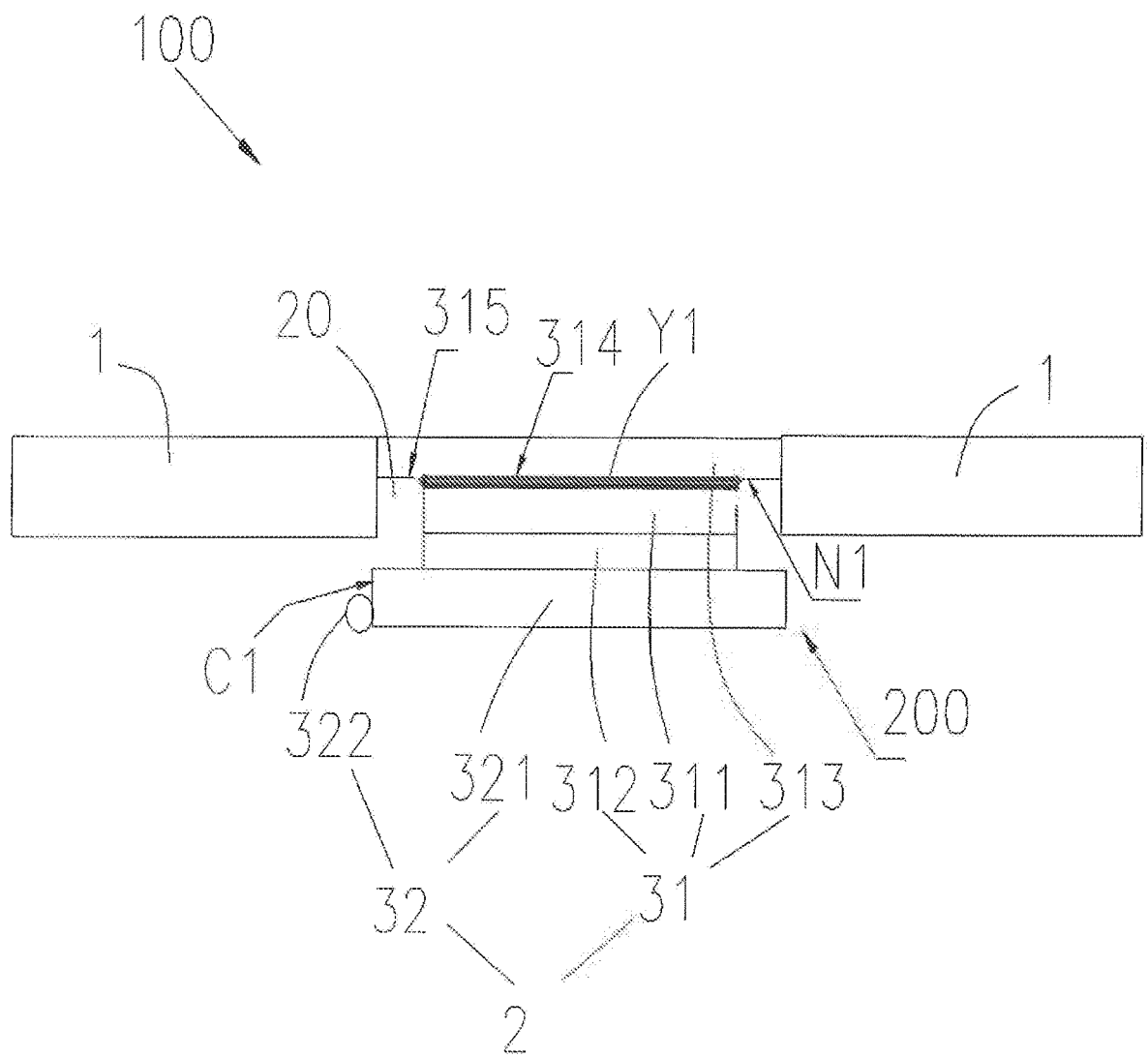
FIG. 2 is a cross-sectional view of the electronic apparatus taken along line II-II of FIG. 1 according to a first embodiment of the present disclosure.

Referring to FIG. 1 and FIG. 2, FIG. 1 is a perspective view of an electronic apparatus 100 shown in a first viewing angle. The electronic apparatus 100 may include a cover assembly 1 and a fingerprint button unit 2. In this case, the cover assembly 1 may define a receiving hole 20, and the fingerprint button unit 2 may be received in the receiving hole 20. Herein, the cover assembly 1 may include an inner side that cannot be seen from the outside of the mobile terminal.

As shown in FIG. 2, the fingerprint button unit 2 may include a fingerprint recognition assembly 31 and a light-emitting portion 32 attached to the fingerprint recognition assembly 31. The fingerprint identification device 31 may include a fingerprint chip 311, a circuit board 312, and a cover 313. The circuit board 312, the fingerprint chip 311, and the cover 313 may be successively stacked on the light-emitting portion 32. That is, the fingerprint chip 311 is sandwiched between the circuit board 312 and the light-emitting portion 32. The circuit board 312 may be located at one side of the fingerprint chip 311 that is close to the light-emitting portion 32, and may be configured to carry the fingerprint chip 311. The cover 313 may be located at one side of the fingerprint recognition assembly 31 that is away from the light-emitting portion 32, and may be configured to protect the fingerprint chip 311. The cover 313 may include an ITO (Indium Tin Oxid) transparent film, and may be conductive. The fingerprint chip 311 may be configured to detect a touch from a user, collect fingerprint information when the user touches the electronic apparatus, perform feature extraction and feature Comparison based on the fingerprint information, and determine whether the collected fingerprint information matches with pre-stored fingerprint information. The circuit board 312 may be configured to carry the fingerprint chip 311 and other functional chips. For example, the circuit board 312 may also carry a power chip configured to supply power to the fingerprint chip 311. The fingerprint chip 311 may be packaged by means of BGA (Ball Grid Array) technology or by means of LGA (Land Grid Array) technology.

In this case, the cover 313 may define a light-shielding region 314 and a light-transmitting region 315. The fingerprint chip 311 may be located at a position below the cover 313 and corresponding to the light-shielding region 314. That is to say, the fingerprint chip 311 may be located at one side of the cover 313 that is close to the light-emitting portion 32. The circuit board 312 may be configured to carry the fingerprint chip 311, and may be located below the fingerprint chip 311 and corresponding to the light-shielding region 314. That is, the circuit board 312 may be located at one side of the fingerprint chip that is away from the cover 313. In this embodiment, a size of the cover 313 may be greater than sizes respectively of the fingerprint chip 311 and the circuit board 312, and projections respectively of the fingerprint chip 311 and the circuit board 312 on the cover 313 may be substantially located in the light-shielding region 314.

The light-emitting portion 32 may be located below the circuit board 312 of the fingerprint recognition assembly 31, and further extend beyond the circuit board 312 of the fingerprint recognition assembly 31. That is, the light-emitting portion 31 may be located at one side of the circuit board 312 that is away from the fingerprint chip 311. A projection of the light-emitting portion 32 on the cover 313 may extend beyond a projection of the circuit board 312 of the fingerprint recognition assembly 31, and further extend into the light-transmitting region 315, such that the light-emitting portion 32 may shield or cover the light-transmitting region 315 from the inner side of the cover assembly 1.

As shown in FIG. 2, an inner surface N1 of the cover 313 that is close to an inner side of the cover assembly 1 may be covered with an ink layer Y1, and the light-transmitting region 315 may be formed by removing the ink in a preset region on the inner surface N1 of the cover 313. Thus, the light-transmitting region 315 is namely the preset region which is not covered by the ink layer Y1. The light-shielding region 314 may be a region in which the inner surface N1 of the cover 313 is covered by the ink layer Y1.

Figure 3:
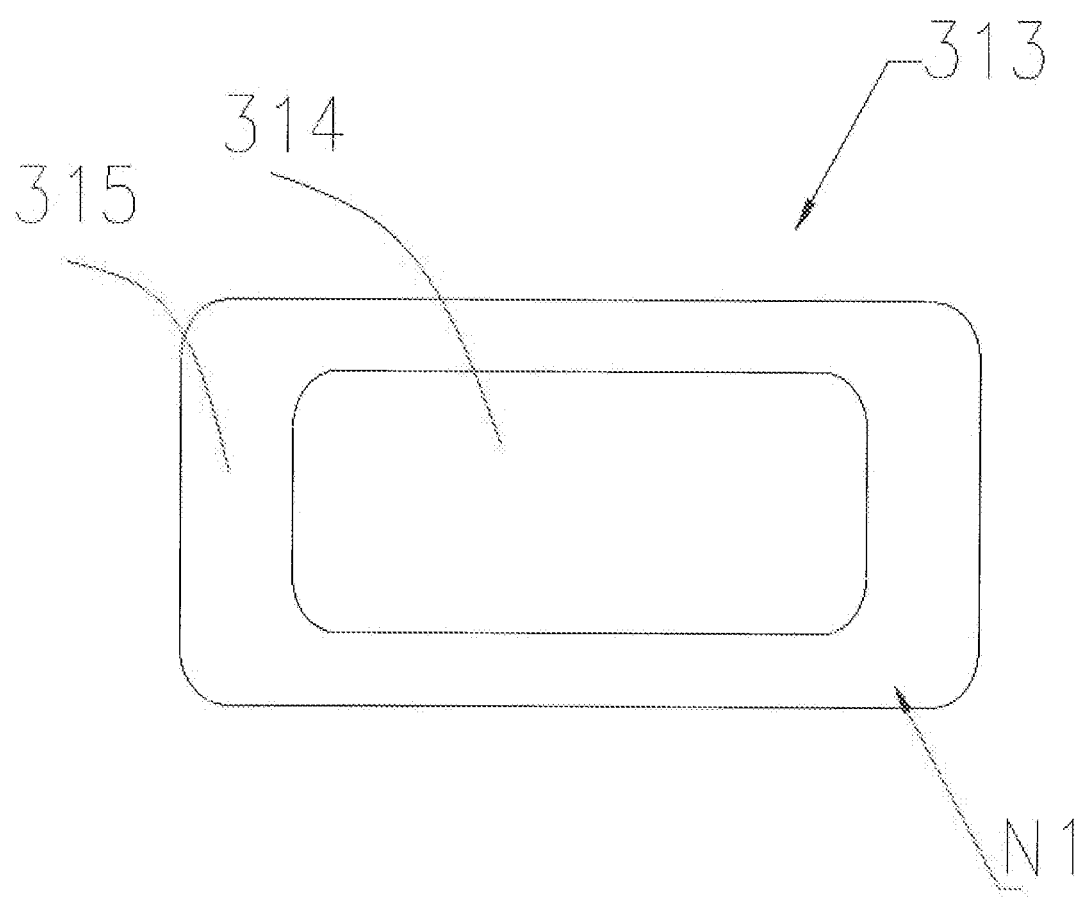
FIG. 3 is a schematic view of an inner surface of a fingerprint cover of the electronic apparatus according to an embodiment of the present disclosure.

Referring to FIG. 3, FIG. 3 is a schematic view of the inner surface N1 of the cover 313. In some embodiments, the light-shielding region 314 may be located at a middle of the cover 313, and the light-transmitting region 315 and the preset region may be the region that is close to an edge of the cover 313. For example, the light-transmitting region 315 and the preset region may be an annular region surrounding the light-shielding region 314. As shown in FIG. 3, in some embodiments, the cover 313 and the light-shielding region 314 may be in shape of an ellipse, and the light-transmitting region 315 may be the annular region in shape of an ellipse and surrounding the light-shielding region 314. As shown in FIG. 1 and FIG. 2, in some embodiments, the receiving hole 20 may also be in shape of an ellipse, and the cover 313 and the receiving hole 20 may be substantially equal in size. In this way, after the cover 313 is received in the receiving hole 20, the cover 313 may be closely attached to a side wall of the receiving hole 20. Herein, the term "closely attached" indicates that, the cover 313 may contact with the side wall of the receiving hole 20, or may abut against the side wall of the receiving hole 20 by means of interference fit. In other embodiments, the cover 313 and the light-shielding region 314 may be in shape of a square, and the light-transmitting region 315 may be an annular region in shape of a square, adjacent to and surrounding the light-shielding region 314. Optionally, the light-transmitting region 315 may also be one or more strip regions adjacent to one or more edges of the light-shielding region 314.

As shown in FIG. 1, in some embodiments, the cover assembly 1 may be a front cover. The cover assembly 1 may further include a frame 11 and a screen receiving area 12. The receiving hole 20 may be defined in a lower region of the frame 11. The electronic apparatus 100 may further include a screen 3 that is received in the screen receiving area 12 of the cover assembly 1. The screen 3 may be a touch screen.

In some embodiments, the cover assembly 1 may include transparent glass, transparent resin, metal, plastic, or the like.

In some embodiments, the light source 32 may emit lights in response to a preset event. The preset event may be a fingerprint touch event. More specifically, when the preset event is a fingerprint touch event, the light-emitting unit 32 may emit lights when the fingerprint chip 311 detects a touch from the user, thereby prompting that the touch from the user initiates the fingerprint recognition function.

As shown in FIG. 2, in some embodiments, the light-emitting portion 32 may include a light-guiding plate 321 and a light source 322. The light-guiding plate 321 may be disposed below the circuit board 312 of the fingerprint recognition assembly 31, that is, the light-guiding plate 321 may be disposed at one side of the circuit board 312 that is away from the fingerprint chip 311. A projection of the light-guiding plate 321 on the cover may extend beyond the circuit board 312 of the fingerprint recognition assembly 31, and further shield or cover the light-transmitting region 315. The light source 322 may be disposed close to the light-guiding plate 321. When the light source 322 emits lights, the light-guiding plate 321 may guide the lights emitted from the light source 322 to the light-transmitting region 315. The emitted lights may be further emitted out of cover 313 via the light-transmitting region 315, and served as a prompt.

Figure 4:
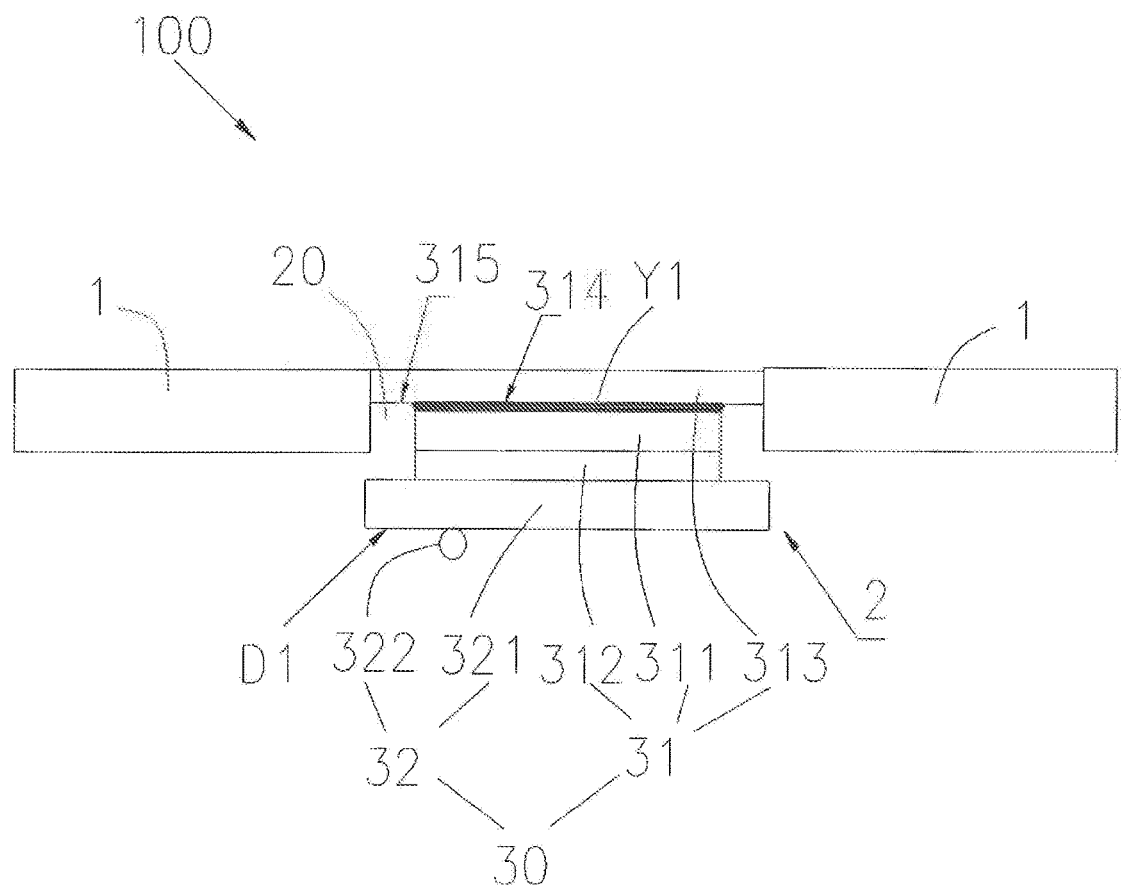
FIG. 4 is a cross-sectional view of the electronic apparatus taken along line II-II of FIG. 1 according to a second embodiment of the present disclosure.

As shown in FIG. 2, in some embodiments; the light source 322 may be disposed at a side wall C1 of the light-guiding plate 321. Referring to FIG. 4, in other embodiments, the light source 322 may be disposed on a bottom surface D1 of the light-guiding plate 321 that is away from the fingerprint recognition assembly 31.

Figure 5:
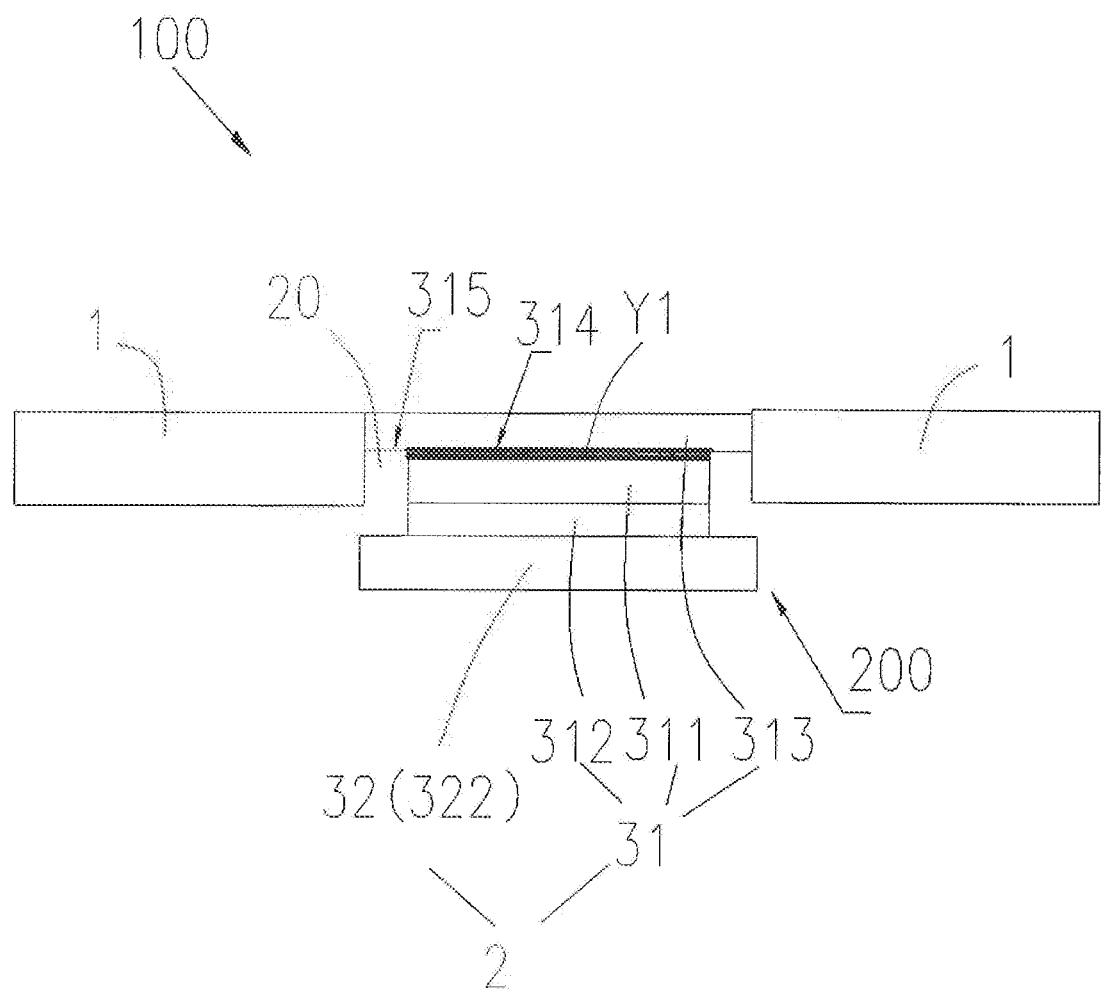
FIG. 5 is a cross-sectional view of the electronic apparatus taken along line II-II of FIG. 1 according to a third embodiment of the present disclosure.

Referring to FIG. 5, in other embodiments, the light-emitting portion 32 may include only the light source 322 disposed below the fingerprint recognition assembly 31. A projection of the light source 322 on the cover 313 may extend beyond the fingerprint recognition assembly 31; the light source 322 may further extend into the light-transmitting region 315. The light source 322 may emit lights in response to the preset event, and the lights may be further emitted out of the cover assembly 1 via the light-transmitting region 315 in order to prompt the preset event. More specifically, the light source 322 may be disposed below the circuit board 312; that is, the light source 322 may be disposed at one side of the circuit board 312 that is away from the fingerprint chip 311. A projection of the light source 322 on the cover 313 may extend beyond the circuit board 312. The light source 322 may further extend below the light-transmitting region 315.

In some embodiments, the light source 322 described above may be an LED lamp group including one LED lamp or a plurality of LED lamps. The LED lamp or the LED lamp group may emit lights in white, red, green, yellow, or the like. The light-guiding plate 321 may include materials such as transparent glass, transparent resin, transparent plastic, or the like.

Figure 6:
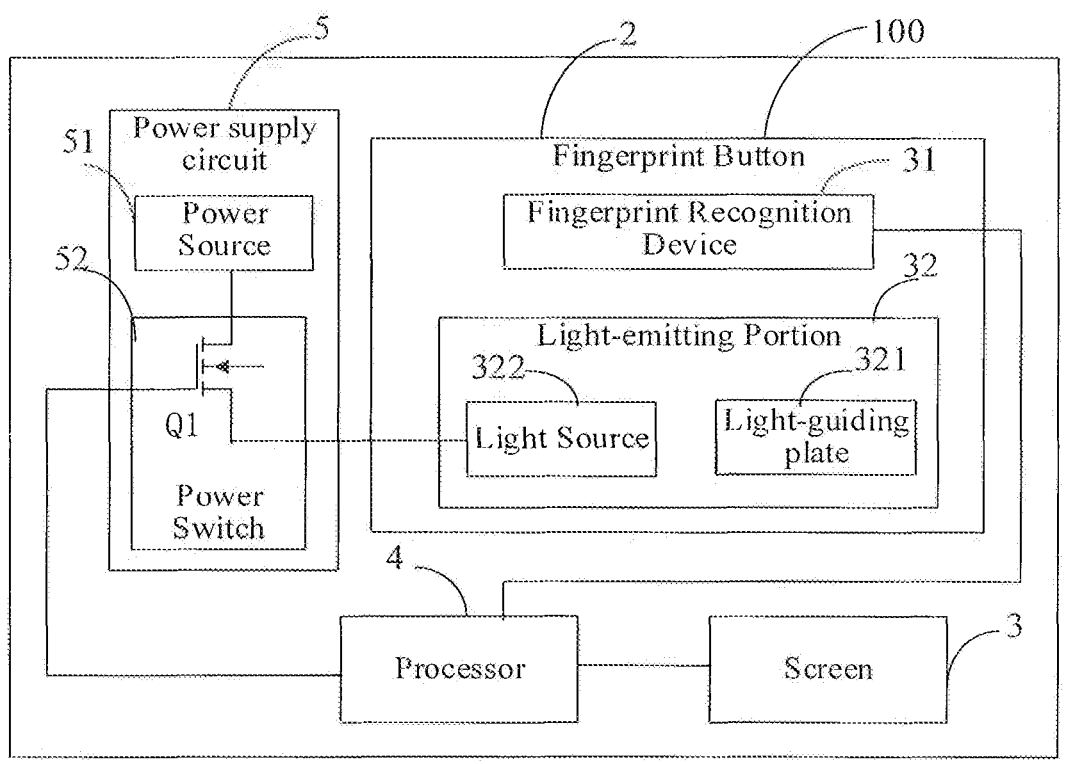
FIG. 6 is a block diagram showing the structure of some components of the electronic apparatus according to an embodiment of the present disclosure.

Referring to FIG. 6, FIG. 6 is a block diagram showing the structure of some components of the electronic apparatus 100. The electronic apparatus 100 may include the fingerprint button unit 2 and the screen 3 described above. The electronic apparatus 100 may further include a processor 4 and a power supply circuit 5.

The power supply circuit 5 may be connected to the light source 322 of the light-emitting unit 32, and configured to supply power to the light source 322. As shown in FIG. 6, the power supply circuit 5 may include a power source 51 and a power switch 52. The power switch 52 may be connected between the power source 51 and the light source 322. The processor 4 may be configured to turn on the power switch 52 when the preset event occurs, such that the power source 51 is capable of supplying power to the light source 322. The light source 322 may emit lights. The emitted lights may be guided to the light-transmitting region 315 via the light-guiding plate 321, and further emitted out of the electronic apparatus from the light-transmitting region 315. The emitted lights may be served as a prompt.

In this case, the power source 51 may be a battery.

As described above, in some embodiments, the preset event may be a fingerprint touch event. The processor 4 may be connected to the fingerprint chip 311 of the fingerprint recognition assembly 31 of the fingerprint button unit 2, and configured to turn on the power switch 52 when the fingerprint chip 311 detects a touch from the user, such that the power source 51 is capable of supplying power to the light source 322. At this time, the light source 322 may be electrically illuminated and emit lights, and the emitted lights may be emitted out of the electronic apparatus via the light-transmitting region 315. When the light-emitting portion 32 includes the light source 322 and the light-guiding plate 321, the light source 322 may emit lights; the emitted lights may be guided to the light-transmitting region 315 via the light-guiding plate 321 and further emitted out of the electronic apparatus from the light-transmitting region 315 for prompting. When the light-emitting portion 32 includes only the light source, the lights emitted from the light source 322 may be directly transmitted to the light-transmitting region 315, and further emitted out of the electronic apparatus from the light-transmitting region 315 for prompting.

As described above, the light source 322 may be operated in a continuous illumination mode or a flickering illumination mode. In one embodiment, when the light source 322 is operated in the continuous illumination mode, the processor 4 may continuously turn on the power switch 52, such that the light source 322 may continuously emit lights, that is, the light source 322 may perform a constant-on illumination. In another embodiment, when the light source 322 is operated in the flickering illumination mode, the processor 4 may alternately turn on and off the power switch 52, such that the light source 322 may emit lights and stop emitting lights alternately, that is, the light source 322 may perform a flickering illumination.

As shown in FIG. 6, in some embodiments, the power switch 52 may be a MOS transistor Q1. A drain electrode of the MOS transistor Q1 may be connected to the power source 51, a source electrode of the MOS transistor Q1 may be connected to the light source 322, and a gate electrode of the MOS transistor Q1 may be connected to the processor 4. The processor 4 may be configured to generate a corresponding level signal to turn on or off the MOS transistor Q1, such that the power source 51 may correspondingly supply power to or stop supplying power to the light source 322, and thus the light source 322 may be powered on and emit lights, or the light source 322 may be powered off and stop emitting lights. More specifically, the power switch 52 may be an N-type MOS transistor Q1 and the processor 4 may be configured to generate a high level signal, and further send the high level signal to the MOS transistor Q1, in order to turn on control the MOS transistor Q1. The processor 4 may also be configured to generate a low level signal, and further send the low level signal to the MOS transistor Q1, in order to turn off the MOS transistor Q1. When the light source 322 is in the continuous illumination mode, the processor 4 may be configured to continuously generate and send high level signals to the MOS transistor Q1 to continuously turn on control the MOS transistor Q1. In this way, the light source 322 is continuously supplied with power, and thus the light source 322 may continuously emit lights. When the light source 322 is in the flickering illumination mode, the processor 4 may be configured to generate and send high level signals and low level signals alternately to the MOS transistor Q1 to alternately turn on and off the MOS transistor Q1. In this way, the light source 322 may be alternately powered on or powered off, and thus the light source 322 may flickeringly emits lights.

In other embodiments, the power switch may be a triode, an IGBT tube, or the like.

In some embodiments, the preset event may further include an incoming call event or a missed call event, an unread short message event, a schedule reminding event, or the like. When an event such as an incoming call event or a missed call event, an unread short message event, a schedule reminding event, or the like occurs, the processor 4 may be further configured to generate and send a corresponding level signal to the power switch 52 to turn on the power switch 52, such that the power source 51 may supply power to the light source 322. The light source 322 may emit lights. The emitted lights may be guided to the light-transmitting region 315 via the light-guiding plate 321, or may be directly transmitted to the light-transmitting region 315 and further emitted out of the electronic apparatus from the light-transmitting region 315 for prompting.

In some embodiments, the cover assembly 1 may also be a rear cover of the electronic apparatus 100. The receiving hole 20 may be defined in the rear cover, and the fingerprint button unit 2 may be received in the receiving hole 20 defined in the rear cover.

In some embodiments, the electronic apparatus 1 may be a mobile phone, a tablet computer, a PDA (personal digital assistant), a sales terminal POS, a car computer, or the like.

Therefore, in the present disclosure, when an event such as an incoming call event or missed call event, an unread short message event, a schedule reminding event, a fingerprint touch event, a button unit press event, or the like occurs, the processor 4 may control the light source 322 of the light-emitting portion 32 to emit lights, in order to generate a corresponding prompt.

In another aspect, a light-emitting prompting device 200 may also be provided. The light-emitting prompting device 200 may be used in the electronic apparatus 100, and configured to prompt the user by means of lights. The electronic apparatus 100 may include a cover assembly 1, and the cover assembly 1 may define a receiving hole 20. The light-emitting prompting device 200 may also include the fingerprint button unit 2 as described above. The fingerprint button unit 2 may be received in the receiving hole 20.

The light-emitting prompting device 200 and the electronic apparatus 100 of the present disclosure may realize the functions of fingerprint button unit and the prompting in the region disposing the fingerprint button unit 2 at the same time. In this way, it is unnecessary to additionally provide a prompting device such as a prompting light in other places of the housing, thereby saving design space.

The above is only some embodiments of the present disclosure, and the protection scope of the present disclosure should not be limited thereto. Those skilled in the art may understand all or parts of the processes for implementing the above embodiments, and make equivalents and modifications based on the claims of the present disclosure. All these shall be covered within the scope of the invention.

What is claimed is:

1. A fingerprint button unit, comprising a fingerprint recognition assembly and a light-emitting portion connected to the fingerprint recognition assembly, wherein the fingerprint recognition assembly comprises:

a cover, defining a light-shielding region and a light-transmitting region, and located at one side of the fingerprint recognition assembly that is away from the light-emitting portion;

a fingerprint chip, located at a position corresponding to the light-shielding region at one side of the cover that is close to the light-emitting portion; and a circuit board, configured to carry the fingerprint chip, and located at a position corresponding to the light-shielding region at one side of the fingerprint chip that is away from the cover;

wherein the light-emitting portion is located at one side of the circuit board that is away from the fingerprint chip; a projection of the light-emitting portion on the cover extends beyond a projection of the circuit board, and further extends into the light-transmitting region, such that the light-emitting portion shields the light-transmitting region.

2. The fingerprint button unit of claim 1, wherein an inner surface of the cover is covered with an ink layer, and the light-transmitting region is a preset region in which the ink layer on the inner surface is removed; the light-shielding region is a region in which the inner surface of the cover is covered by the ink layer.

3. The fingerprint button unit of claim 2, wherein the light-shielding region is located at a middle of the cover, and the light-transmitting region is a region close to an edge of the cover.

4. The fingerprint button unit of claim 2, wherein the light-emitting portion comprises a light-guiding plate and a light source; the light-guiding plate is disposed at one side of the circuit board that is away from the fingerprint chip, a projection of the light-guiding plate on the cover extends beyond that of the circuit board, and covers the light-transmitting region; the light source is disposed close to the light-guiding plate; the light source emits lights in response to a preset event; the lights emitted from the light source are guided to the light-transmitting region via the light-guiding plate, and further emitted out of the cover to prompt the preset event.

5. The fingerprint button unit of claim 2, wherein the light-emitting portion comprises a light source disposed at one side of the circuit board that is away from the fingerprint chip, a projection of the light source on the cover extends beyond the circuit board, and further extends into the light-transmitting region; the light source emits lights in response to a preset event; the lights emitted from the light source are further emitted out of the cover via the light-transmitting region to prompt the preset event.

6. A light-emitting prompting device, used in an electronic apparatus comprising a cover assembly; the cover assembly defining a receiving hole and comprising an inner side; wherein the light-emitting prompting device comprises a fingerprint button unit received in the receiving hole; the fingerprint button unit comprises a fingerprint recognition assembly and a light-emitting portion connected to the fingerprint recognition assembly, wherein the fingerprint recognition assembly comprises:

a cover, defining a light-shielding region and a light-transmitting region, and located at one side of the fingerprint recognition assembly that is away from the inner side of the cover assembly;

a fingerprint chip, located at a position corresponding to the light-shielding region at one side of the cover that is close to the inner side; and a circuit board, configured to carry the fingerprint chip, and located at a position corresponding to the light-shielding region at one side of the fingerprint chip that is away from the cover;

wherein the light-emitting portion is located at one side of the circuit board that is away from the fingerprint chip; a projection of the light-emitting portion on the cover extends beyond a projection of the circuit board, and further extends into the light-transmitting region, such that the light-emitting portion shields the light-transmitting region from the inner side of the cover assembly.

7. An electronic apparatus, comprising a cover assembly and a fingerprint button unit; the cover assembly defining a receiving hole; the fingerprint button unit comprising a fingerprint recognition assembly and a light-emitting portion, and the fingerprint recognition assembly being received in the receiving hole; the fingerprint recognition assembly comprising:

a cover, defining a light-shielding region and a light-transmitting region, and located at one side of the fingerprint recognition assembly that is away from the inner side of the cover assembly;

a fingerprint chip, located at a position corresponding to the light-shielding region at one side of the cover that is close to the inner side; and a circuit board, configured to carry the fingerprint chip, and located at a position corresponding to the light-shielding region at one side of the fingerprint chip that is away from the cover;

wherein the light-emitting portion is located at one side of the circuit board that is away from the fingerprint chip; a projection of the light-emitting portion on the cover extends beyond a projection of the circuit board, and further extends into the light-transmitting region, such that the light-emitting portion shields the light-transmitting region from the inner side of the cover assembly.

8. The electronic apparatus of claim 7, wherein an inner surface of the cover that is close to the inner side of the cover assembly is covered with an ink layer, and the light-transmitting region is a preset region in which the ink layer on the inner surface is removed; the light-shielding region is a region in which the inner surface of the cover is covered by the ink layer.

9. The electronic apparatus of claim 8, wherein the light-shielding region is located at a middle of the cover, and the light-transmitting region is the region close to an edge of the cover.

10. The electronic device of claim 8, wherein the light-emitting portion comprises a light-guiding plate and a light source; the light-guiding plate is disposed at one side of the circuit board that is away from the fingerprint chip, a projection of the light-guiding plate on the cover extends beyond that of the circuit board, and covers the light-transmitting region; the light source is disposed close to the light-guiding plate; the light source emits lights in response to a preset event; the lights emitted from the light source are guided to the light-transmitting region via the light-guiding plate, and further emitted out of the cover to prompt the preset event; or the light-emitting portion comprises a light source disposed at one side of the circuit board that is away from the fingerprint chip, a projection of the light source on the cover extends beyond the circuit board, and further extends into the light-transmitting regions; the light source emits lights in response to a preset event; the lights emitted from the light source are further emitted out of the cover via the light-transmitting region to prompt the preset event.

11. The electronic apparatus of claim 8, wherein the electronic apparatus further comprises:
   a power supply circuit, connected to a light source of the light-emitting portion and configured to supply power to the light source; wherein the power supply circuit comprises a power source and a power switch, and the power switch is connected between the power source and the light source; and
   a processor, configured to turn on the power switch when the preset event occurs, such that the power source is capable of supplying power to the light source, and the light source emits lights; the lights emitted from the light are emitted out of the electronic apparatus via the light-transmitting region for prompting.

12. The electronic apparatus of claim 11, wherein the preset event is a fingerprint touch event; the processor is further connected to the fingerprint chip of the fingerprint recognition assembly, and configured to turn on the power switch when a touch from a user is detected by the fingerprint chip, such that the power source is capable of supplying power to the light source, and the light source is electrically illuminated and emits lights; the emitted lights are emitted out of the electronic apparatus via the light-transmitting region.

13. The electronic apparatus of claim 11, wherein the processor is configured to continuously turn on the power switch, such that the light source continuously emits lights; or the processor is configured to alternately turn on and off the power switch, such that the light source flickeringly emits lights.

14. The electronic apparatus of claim 11, wherein the power switch is a MOS transistor; a drain electrode of the MOS transistor is connected to the power source, a source electrode of the MOS transistor is connected to the light source, and a gate electrode of the MOS transistor is connected to the processor; the processor is configured to generate a corresponding level signal to turn on or off the MOS transistor.

15. The electronic apparatus of claim 7, wherein the cover assembly is a front cover or a rear cover of the electronic apparatus.

16. The electronic apparatus of claim 7, wherein the fingerprint chip is packaged by means of ball grid array technology or by means of land grid array technology.

17. The light-emitting prompting device of claim 6, wherein an inner surface of the cover that is close to the inner side of the cover assembly is covered with an ink layer, and the light-transmitting region is a preset region in which the ink layer on the inner surface is removed; the light-shielding region is a region in which the inner surface of the cover is covered by the ink layer.

18. The light-emitting prompting device of claim 17, wherein the light-shielding region is located at a middle of the cover, and the light-transmitting region is a region close to an edge of the cover.

19. The light-emitting prompting device of claim 6, wherein the light-emitting portion comprises a light-guiding plate and a light source; the light-guiding plate is disposed at one side of the circuit board that is away from the fingerprint chip, a projection of the light-guiding plate on the cover extends beyond that of the circuit board, and covers the light-transmitting region; the light source is disposed close to the light-guiding plate; the light source emits lights in response to a preset event; the lights emitted from the light source are guided to the light-transmitting region via the light-guiding plate, and further emitted out of the cover to prompt the preset event.

20. The light-emitting prompting device of claim 6, wherein the light-emitting portion comprises a light source disposed at one side of the circuit board that is away from the fingerprint chip, a projection of the light source on the cover extends beyond the circuit board, and further extends into the light-transmitting region; the light source emits lights in response to a preset event; the lights emitted from the light source are further emitted out of the cover via the light-transmitting region to prompt the preset event.

* * * * *